Dec. 6, 1955

P. P. SMITH 2,725,993

POSITIONING DEVICE

Filed Aug. 28, 1951

INVENTOR.
Phillips P. Smith
BY Roland A. Anderson

Attorney

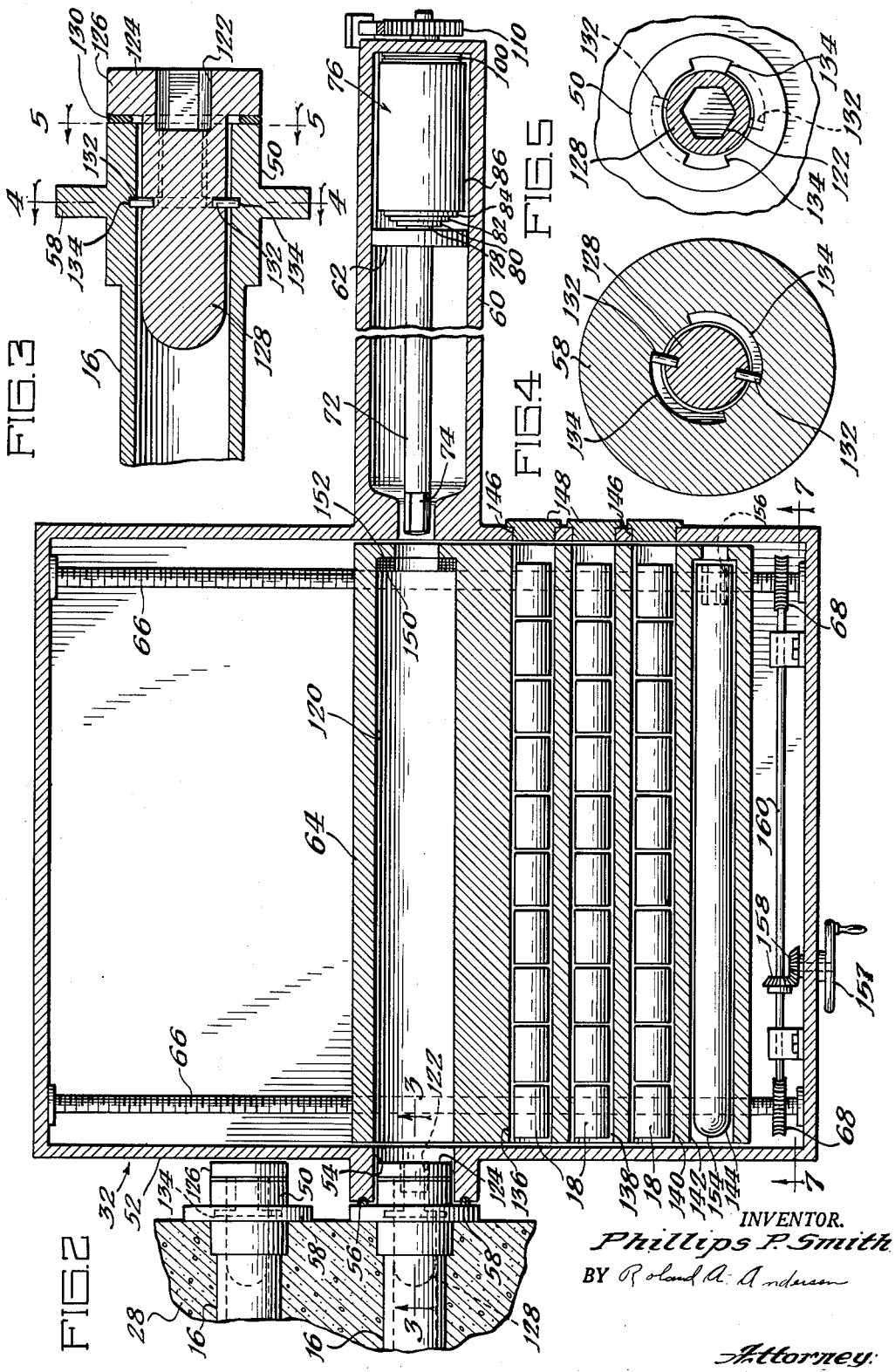

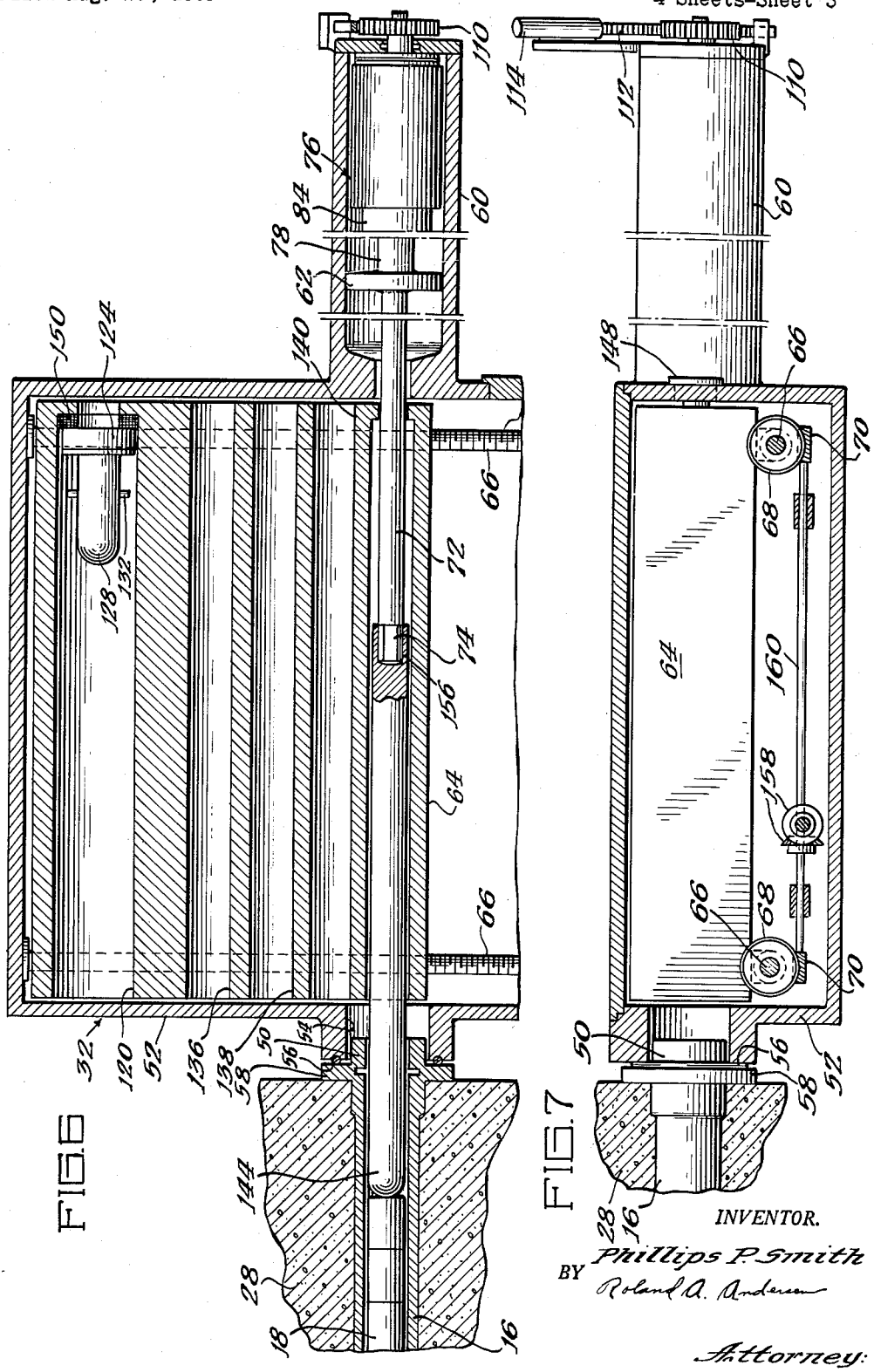

Dec. 6, 1955 P. P. SMITH 2,725,993
POSITIONING DEVICE
Filed Aug. 28, 1951 4 Sheets-Sheet 4
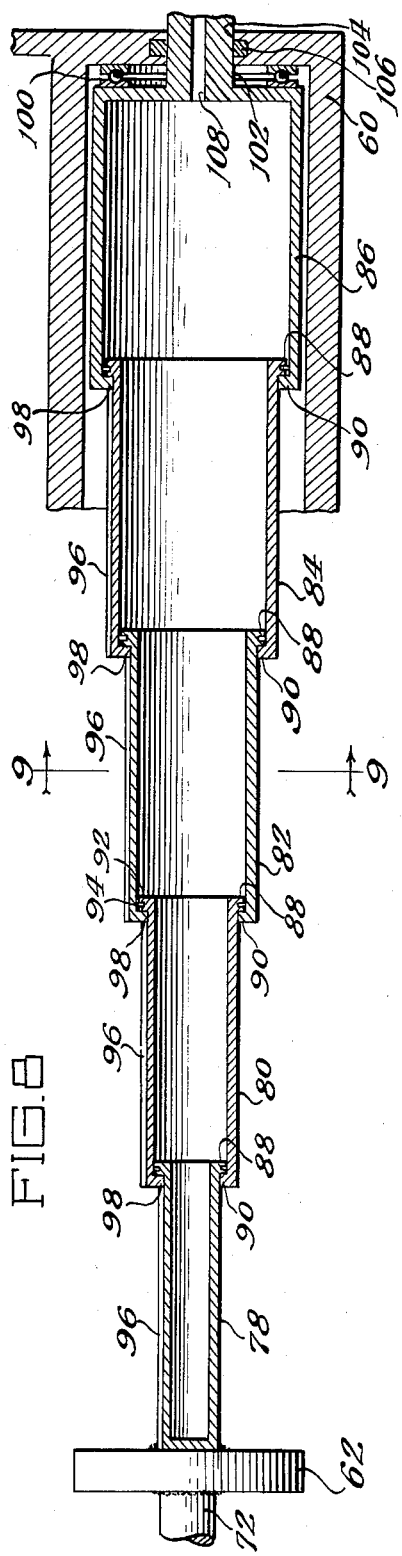
INVENTOR.
Phillips P. Smith
BY Roland A. Anderson
Attorney.

United States Patent Office 2,725,993
Patented Dec. 6, 1955

2,725,993

POSITIONING DEVICE

Phillips P. Smith, San Antonio, Tex., assignor to the United States of America as represented by the United States Atomic Energy Commission Application August 28, 1951, Serial No. 243,965

4 Claims. (Cl. 214—23)

The present invention relates to nuclear reactors and particularly to a device for charging bodies of fissionable material into a reactor without requiring complete shut-down of the reactor or of the cooling system.

An object of the present invention is to provide a new device for charging cartridges of fissionable material into a neutronic reactor. This is to be accomplished without requiring an operator of the device to expose himself to the harmful effects of neutrons and of radioactive radiations emanating from the reactor during the charging operation. In addition, the charging operation is to be achieved without shutting down the pile or stopping the flow of the coolant fluid through the tubes to be charged.

In addition to the objects and advantages above described others will become apparent from the following description and drawings, in which:

Figure 2 is a horizontal sectional view of a charging device illustrating one embodiment of the present invention, the device being attached to the charging end of a process tube;

Figure 3 is an enlarged, longitudinal, sectional view taken on the line 3—3 of Figure 2;

Figure 4 is a transverse sectional view taken on the line 4—4 of Figure 3;

Figure 5 is a transverse sectional view shown partly in elevation taken on the line 5—5 of Figure 3;

Figure 6 is a horizontal sectional view of the charging device but showing the parts disposed in a position different from that shown in Figure 2;

Figure 7 is a vertical longitudinal sectional view partly in elevation of the charging device;

Figure 8 is a longitudinal, vertical sectional view of a telescopic hydraulic ram forming part of the charging mechanism;

Figure 9 is an enlarged transverse sectional view taken on the line 9—9 of Figure 8; and Figure 10 is an end view of the charging device showing the turning gear drive.

Figure 1:
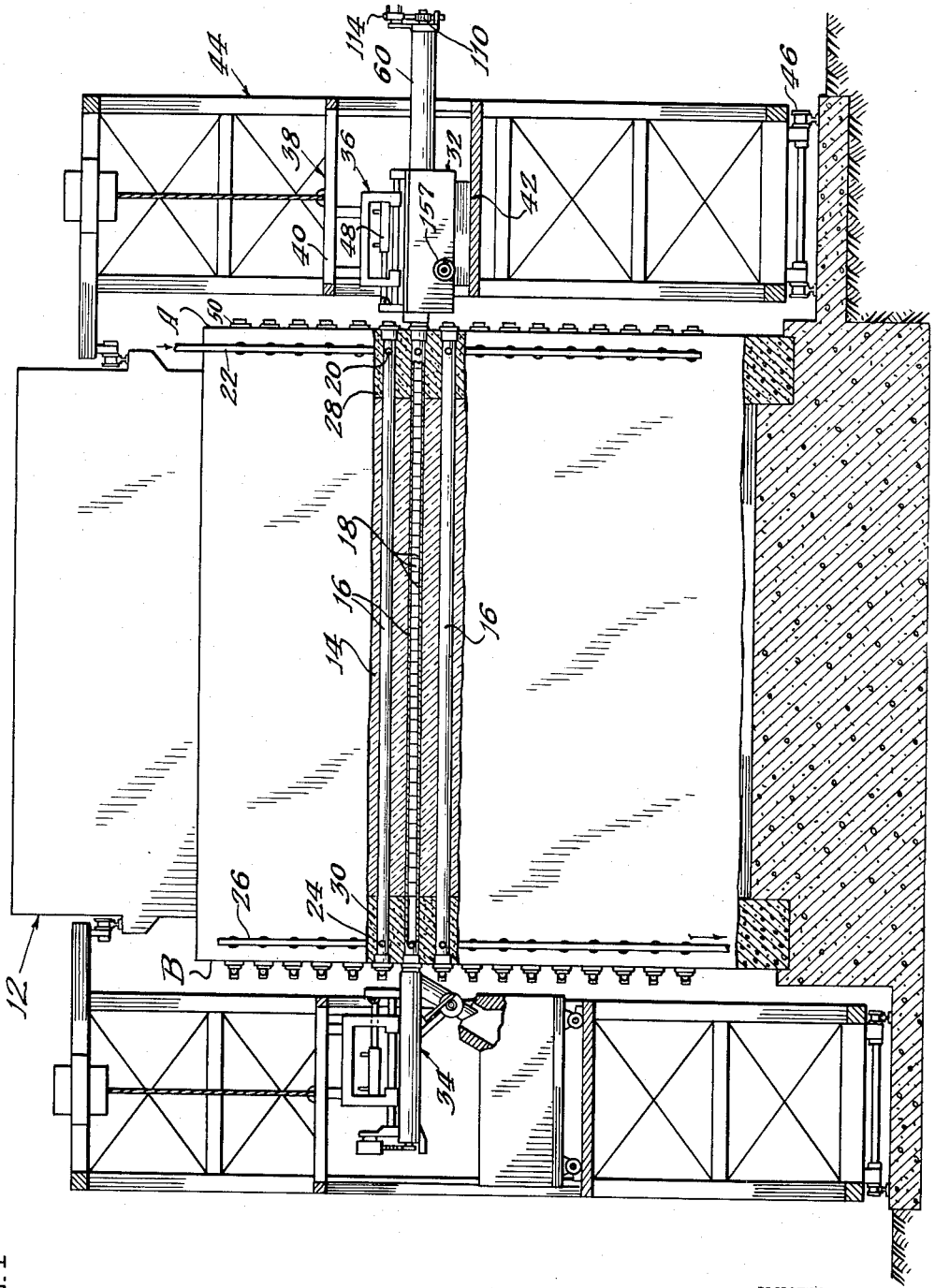
Figure 1 is a diagrammatic view of a neutronic reactor showing the charging device that is the subject matter of the present invention in position to charge bodies of fissionable material into the reactor and also showing a discharging device in position on the discharging side of the reactor to receive bodies discharged from the reactor.

In Figure 1 of the drawings a neutronic reactor is generally indicated at 12. Because the details of this reactor form no part of the present invention, only those portions deemed necessary for an understanding of the invention will be explained. Accordingly the reactor 12 comprises a moderator 14 of graphite, for example, through which are disposed a plurality of horizontal tubes 16 adapted to accommodate therein bodies or slugs of fissionable material 18. For illustrative purposes these bodies of fissionable material are shown in the form of uranium or plutonium rods at 18 in Figure 2. Likewise for purposes of illustration the reactor 12 has a charging side "A" (see Figure 1) where the slugs 18 are introduced into the tubes 16, and a discharging side "B" where these slugs are removed from the tubes. Near the charging end of each tube 16 is a coolant inlet 20 which connects with a supply pipe 22 leading from a source not shown in the drawing. Similarly near the discharging end of each tube 16 is a coolant outlet 24 which connects with a drain pipe 26. Across the face of the charging side "A" is a shield 28 for preventing the escape of harmful neutrons and radioactive rays that emanate from the reactor. A similar shield 30 is disposed across the face of the discharge side "B" for the same purposes. Although the shields 28 and 30 are shown to be made of concrete having perforations for the accommodation of the tubes 16, in actual practice these shields may be composed of a variety of well known elements suitable for shielding purposes.

On the charging side "A" is a charging device generally indicated at 32 which constitutes the subject matter of the present invention. On the discharging side "B" is disposed a discharging device generally indicated at 34 which constitutes the subject matter of my copending application, Serial No. 212,035, filed February 21, 1951. Although the charging device 32 and the discharging device 34 are best adapted to be used together, each device may be used separately with or without other devices of a similar nature.

The charging device 32 forming the subject matter of the present invention is shown in Figure 1 suspended from a supporting apparatus generally indicated at 36. In turn the supporting apparatus 36 is attached to an elevator generally indicated at 38 that has a cross beam 40 and a platform 42. An elevator structure 44 is provided to permit the elevator 38 to move vertically of the charging side "A." The structure 44 may be mounted on wheels 46 permitting travel in a horizontal direction across the face of the charging side "A." In this manner the charging device 32 is caused to address the charging end of any one of the plurality of tubes 16 symmetrically disposed across the face of the charging side "A."

In addition the supporting apparatus 36 includes a hydraulic drive ram 48 that enables an operator standing on the platform 42 to manipulate the charging device 32 into engagement with a nozzle 50 on the charging end of a particular tube 16.

Referring to Figure 2, the charging device generally indicated at 32 is set forth in greater detail. It includes a housing 52 made of lead or other material suitable for resisting the passage of radioactive rays. The housing 52 completely encloses the operating parts of the charging device except for an aperture 54 extending from the side of the housing adjacent the charging nozzles 50. As the aperture 54 is seated over the nozzle 50 a fluid-tight seal is created by means of an annular gasket 56 that is caused to abut a circular flange 58 extending radially of the nozzle 50. As was mentioned above, the hydraulic drive ram 48 is used to manipulate said aperture into the sealed position about nozzle 50.

Within the housnig 52 are the operating parts including a cylinder 60 and a piston 62, a magazine 64, and means for moving said magazine including a pair of screws 66, a worm wheel 68 at one end of each screw 66 and a worm 70 (see Figure 7) engaging each worm wheel 68. Specifically the cylinder 60 is disposed within the housing 52 in alignment with the aperture 54 in such a manner that as the piston 62 advances in a direction toward the aperture, an elongated wrench 72 moves into said aperture. The wrench 72 is centrally disposed on the longitudinal axis of the cylinder 60 firmly attached to the front face of the piston 62 and having a hexagonal male member 74 on its advance end.

At the end of the cylinder 60 remote from the aperture 54 is disposed a means to reciprocate the piston 62 including a hydraulic ram generally indicated at 76 having several telescopic sections 78, 80, 82, 84 and 86 shown nested together in Figure 2. As shown in Figure 8, the advance end of section 78 is secured to the back face of the piston 62. With the exception of the section 86 the several sections each has an annular flange 88 at its end most remote from the piston 62. Each flange 88 extends outwardly and radially of the longitudinal axis thereof and is adapted to abut an annular shoulder 90 at the forward end of each section, except section 78, when the ram is fully expanded. About the periphery of each annular flange 88 is an annular groove 92 accommodating an annular gasket 94, which is adapted to engage the inside surface of each section in such manner as to prevent the escape of hydraulic fluid from within the ram. In addition, a keyway 96 is disposed longitudinally of the outer surface of each section except section 86. Into said keyway fits a key 98 extending radially inward of the annular shoulder 90 (see Figure 9). At the end of cylinder 60 remote from the aperture 54, the telescopic section 86 is mounted on an annular bearing 100 against which it is held by a trunnion 102 which is integral with said section and which extends through an aperture 104 in the end face of said cylinder. An annular gasket 106 provides a fluid seal therewith. A bore 108 extending centrally of the trunnion 102 is the passage through which the hydraulic fluid enters and leaves the telescopic ram 76. Outside the cylinder 60 a pinion 110 is keyed to the trunnion 102 as shown in Figures 2, 6, and 7. Said pinion is part of the rotating means of the ram 76. Engaging said pinion is a rack 112 that is motivated hydraulically by a hydraulic chamber 114 having inlets 116. These details are set forth clearly in Figure 10. The hydraulic fluid for the ram 76 is supplied through a conduit 118 which connects the bore 108 with a hydraulic fluid source not shown in the drawing. By virtue of this rotating means, a linear motion of the rack 112 is transferred to a rotational movement through the pinion 110 from which said movement is transmitted through the trunnion 102 and telescopic section 86 to the other several sections 78, 80, 82 and 84 via the keys 98 and keyway 96. Further, the rotary motion is transferred to the piston 62 and the elongated wrench 72.

In its normal position the ram 76 is disposed in a contracted position shown in Figure 2. That is, the several sections 84, 82, 80 and 78, respectively, fit telescopically within each other. At the same time the forward end of the elongated wrench 72 is retracted from that portion of the housing 52 containing the magazine 64. In the expanded position, as shown in Figure 8, the ram 76 extends the wrench 72 through a plug chamber 120 (Figure 2) in said magazine 64 to the aperture 54 where the hexagonal male member 74 may be seated into a hexagonal bore 122 which is longitudinally disposed in a plug 124 which seals the nozzle 50.

In Figure 3 the manner in which the plug 124 is mounted within the nozzle 50 is shown. The plug 124 includes two integral parts, one being a circular flange 126 disposed in a plane normal to the axis of the tube 16 and the other being a member 128 disposed in said axis and normal to said flange. At the center of the circular flange 126 lies the hexagonal bore 122. Between the vertical faces of the flange 126 and the nozzle 50 is disposed an annular gasket 130 which serves to prevent the escape of coolant fluid within the tube 16. In addition, a pair of bayonet lugs 132 oppositely disposed extend radially from the cylindrical surface of the member 128 into a pair of corresponding bayonet grooves 134 which are disposed adjacent the inside surface of the tube 16 (Figures 4 and 5).

The magazine 64, as shown in Figure 2, includes the plug chamber 120, three slug chambers 136, 138 and 140, respectively, and a chamber 142 adapted to house a ram rod 144. All chambers are disposed parallel to the longitudinal axis of the tube 16 and are adapted to be aligned between the aperture 54 with the cylinder 60. Said alignment is possible when the magazine 64 is moved in a direction normal to the aforementioned longitudinal axis until each chamber 136, 138, 140 and 142, respectively, is disposed between the aperture 54 and the cylinder 60. The chambers 136, 138, and 140 are adapted to contain slugs of fissionable material 18 disposed in an end-to-end relationship and loaded through apertures 146 in the housing which are normally covered by lead plugs 148. At the rear of the chamber 120 is mounted a magnet 150 which is disposed against an annular shoulder 152 neither of which elements interfere with the movement of the elongated wrench 72. The advance end of the ram rod 144 is rounded at 154 and in the other end is disposed a hexagonal bore 156 similar to the bore 122 disposed in the plug 124 and adapted to receive the hexagonal male member 74 of the elongated wrench 72.

By turning a hand wheel 157 in Figure 2 the force is transferred to a pair of bevel gears 158 through a shaft 160 to the worms 70. In this manner the magazine may be moved from that position shown in Figure 2 to the position shown in Figure 6, and the chambers 136, 138, 140 and 142 may be consecutively indexed with the aperture 54.

Operation of the invention begins with the loading of the slugs 18 of fissionable material into the several chambers 136, 138 and 140 through the apertures 146 of the housing 52 after which the lead plugs 148 are secured in place. The device is then raised on the elevator 38 across the charging side "A" of the reactor 12 until the aperture 54 addresses the desired nozzle 50. An operator standing on the platform 42 actuates a hydraulic fluid valve (not shown in the drawing) causing the hydraulic drive ram 48 to move the charging device 32 toward the nozzle 50 seating the aperture 54 over it and causing the annular gasket 56 to abut the flange 58 of said nozzle in a fluid-tight manner (Figures 1 and 2). This position is sustained throughout the balance of the charging operation. Referring to Figure 2 the drive ram 76 is then expanded from the position shown to that shown in Figure 8 by pumping hydraulic fluid into said ram through the bore 108. At this phase the wrench 72 extends longitudinally through the plug chamber 120 and the male member 74 is seated within the hexagonal bore 122 of the plug 124. The hydraulic chamber 114 (Figure 10) then actuates the rack 112 causing the pinion 110 to rotate the drive ram 76. As was mentioned above this rotational movement is transmitted through the various telescopic sections to the elongated wrench 72, which in turn so manipulates the plug 124 as to rotate the bayonet lugs 132 from the locked position within the bayonet grooves 134. Immediately the pressure of the coolant fluid moving through the tube 16 forces the plug 124 out of the sealed position. This is accomplished by slowly reducing the hydraulic fluid pressure within the drive ram 76 to a point below the pressure of the coolant fluid within the tube 16. As the plug 124 continues to retract from the nozzle 50, the main pressure of the coolant fluid forces the piston 62 to the fully retracted position, the plug 124 lodging itself against the magnet 150 in the end of the chamber 120 remote from said nozzle. The coolant fluid fills the entire housing 52 whereby it is possible to load the tube 16 with the slugs 18 of fissionable material. Accordingly, charging may be accomplished while the pile is under full power operation, the coolant water circulating without interruption during the charging operation.

Upon removal of the plug 124 there is an unobstructed passage leading from the tube 16 to the aperture 54. Accordingly, the operator turns the handwheel 157 causing the magazine 64 to move from that position shown in Figure 2 to a position in which the slug chamber 136 is aligned with said nozzle. The telescopic ram 76 is then actuated by increasing the pressure of the hydraulic fluid therein above that of the coolant medium against the piston 62 sending the wrench 72 through the chamber 136. This forces the new slugs 18 of fissionable material in said chamber to be charged into the tube 16. Upon completion of the charge the hydraulic pressure within the ram is reduced to a pressure below that of the coolant medium whereupon the wrench 72 is detracted from the chamber 136. Again the operator turns the handwheel 157 until the slug chamber 138 is aligned with the nozzle 50 and the hydraulic ram 72 is reactivated to send said wrench through the chamber 138 thereby charging the new slugs 18 of fissionable material into the tube 16 behind the previous charge. This operation is repeated for the chamber 140 upon the completion of which the magazine 64 is returned to its original position (Figure 2) and the plug 124 is returned to the locked position within the nozzle 50 by the wrench 72. The charging machine may then be disconnected from the nozzle 50 and lowered to ground level in order to refill the chambers 136, 138, and 140 with fissionable material.

In the foregoing description of the operation it has been assumed not only that the length of the tube 16 equals the sum of the length of the chambers 136, 138, and 140 but that a full tube charge was in order. It is apparent however that this invention is adaptable to permit continuous slug-by-slug charging or segmental charging. Under the continuous slug-by-slug method, one slug 18 is charged at a time and if the reactor 12 has been in operation for some time, the tube 16 is filled with similar slugs which means that for each new slug charged an expended slug must be discharged at the other end. Depending upon the design of the tube 16 at the discharge end, said tube may or may not have a plug at said end. In the event that there is a plug the discharging device 34 heretofore mentioned may be used simultaneously with the use of the present invention. Under the segmental charging method, a portion of the tube 16 is charged at one time, which portion may be as high as one-third of the entire charge. Whatever the mode of charging, however, it is desirable to place the last slug charged within the inside face of the shield 28, that is, within the region of the moderator 14 (Figure 1). For this purpose the ram rod 144 is attached to the hexagonal male member 74 of the wrench 72, as shown in Figure 6, so as to give said wrench an extension. When it is desirable to return the ram rod 144 from the tube 16, the pressure of the coolant medium therein exerts itself upon the rounded end 154 thereof to expel it back into its chamber 142. In case of emergency, the ram rod 144 may be used to urge the entire length of the tube 16 of the slugs 18 contained therein.

Since certain changes can be made in the foregoing device and different steps may be employed in practicing the invention, it is intended that all matter shown in the accompanying drawing and described hereinbefore shall be interpreted as illustrative only and may be modified without departing from the intended scope of the invention.

What is claimed is:

1. A device for charging slugs into a pressurized tube carrying at one end a closure plug detachable therefrom upon rotation with respect thereto, said device comprising a housing having front and rear sides, said front side having an aperture in midposition, a cylinder mounted on the said rear side and in axial alignment with said aperture, a magazine movably mounted within said housing and having a first chamber adapted to store the plug when detached from the tube and a second chamber for holding a plurality of slugs arranged end to end, the chambers being spaced from one another and extending through the magazine parallel to one another and to a line between the aperture and the cylinder, means for moving said magazine with respect to the housing transversely of said line to bring the chambers consecutively into alignment with said aperture and said cylinder, a piston mounted within said cylinder and being expandible and contractible axially of the cylinder, an elongated wrench attached to said piston coaxially therewith so as to extend through the magazine to the tube when the piston is expanded and to be withdrawn from the magazine and the housing into the cylinder when the piston is contracted, means for rotating said piston when expanded to cause the wrench to rotate the closure plug into or out of attachment with the tube, and means for contracting and expanding the piston to cause the wrench to pull the plug into the first chamber or to push it out of the first chamber to the tube and to push the slugs out of the second chamber into the tube.

2. The device specified in claim 1 and further comprising a magnet mounted in the first chamber and having a central opening large enough to pass the wrench therethrough and small enough to prevent passage of the plug, the plug upon being detached from the tube by the wrench being forced by the pressure fluid in the tube to follow the wrench on its withdrawal as far as the magnet, the magnet holding the plug so as to enable the wrench properly to engage the plug for reattaching the same to the tube after the wrench has pushed the plug from the second chamber into the tube.

3. The device specified in claim 2, the magazine being provided with a third chamber extending therethrough parallel to the first and second chambers and on the side of the second chamber opposite the first chamber and having a restricted portion adjacent the end at the rear wall of the housing, the device also comprising a ram rod positioned in the third chamber and being too large to pass through the restricted portion, whereby the piston may be expanded to cause the wrench to go through said restricted portion and to force the ram rod into the tube, thereby pushing the slugs farther into the tube than is possible with the wrench alone, and upon contraction of the piston the pressure fluid in the tube forces the ram rod back all the way into the third chamber and against the restricted portion therein.

4. The device specified in claim 1, the piston comprising a plurality of concentric nested sections formed to include an internal annular shoulder on their forward end, except the forward end of the forward section which is solid, and an external annular flange on their rearward end except the rear end of the rear section, a hollow trunnion attached coaxially to the rear piston section and extending through the rear wall of the cylinder, the piston-contracting and -expanding means being connected to the trunnion exteriorly of the cylinder to supply pressure fluid through the trunnion to the interior of the piston, the means for rotating the piston being connected to the trunnion exteriorly of the cylinder.

References Cited in the file of this patent

UNITED STATES PATENTS

| | | |
|---|---|---|
| 428,749 | Frank | May 27, 1890 |
| 1,278,307 | Cressler | Sept. 10, 1918 |
| 1,607,269 | Malmquist | Nov. 16, 1926 |
| 1,979,507 | Underwood | Nov. 6, 1934 |
| 2,290,568 | McIntosh | July 21, 1942 |
| 2,523,025 | Jeppson et al. | Sept. 19, 1950 |
| 2,578,760 | Strickland | Dec. 18, 1951 |